Jan. 18, 1966     R. C. MANSPERGER     3,229,988
CONVERSION AXLE FOR THREE WHEEL BICYCLE
Filed Jan. 13, 1964
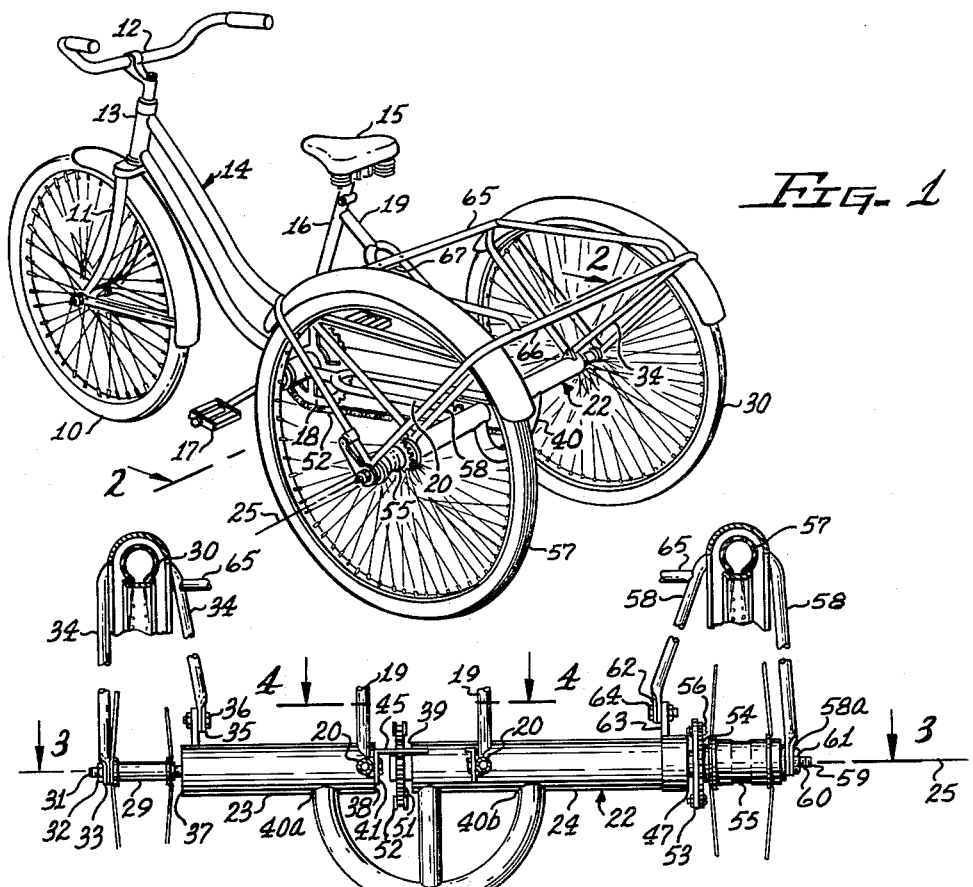
FIG-1
FIG-2
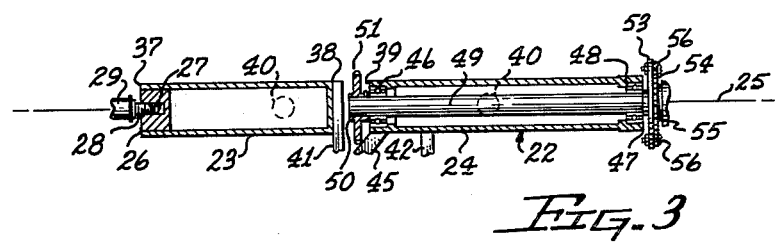
FIG-3
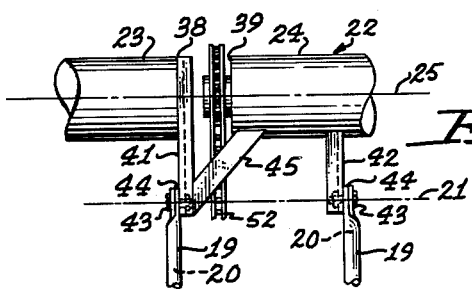
FIG-4
INVENTOR.
RICHARD C. MANSPERGER
BY
Willard S. Grow
ATTORNEY United States Patent Office 3,229,988
Patented Jan. 18, 1966

3,229,988
CONVERSION AXLE FOR THREE
WHEEL BICYCLE
Richard C. Mansperger, Phoenix, Ariz.
(202 N. Central, Peoria, Ariz.)
Filed Jan. 13, 1964, Ser. No. 337,218
2 Claims. (Cl. 280—7.15)

This invention pertains to a conversion axle for changing a two-wheel bicycle into a three-wheel bike.

One of the objects of this invention is to provide a conversion axle for a bicycle adapted to change it to a three-wheeled vehicle in which no change is required in the structure and mechanism of the bicycle.

Another object of this invention is to provide a three-wheel conversion unit for a bicycle in which only an additional standard front wheel is required to complete the change over with the unit.

Still another object is to provide a bicycle three-wheel conversion axle in which the original coaster-brake rear wheel of the bicycle and an additional standard front wheel are mounted in axial alignment and the regular bicycle pedals and sprocket are connected without modification to drive the coaster-brake wheel.

Further features and advantages of this invention will appear from a detailed description of the drawings in which:

FIG. 1 is a general perspective view of a bicycle converted to a three-wheel vehicle incorporating the features of this invention.

FIG. 2 is a vertical sectional view looking rearwardly of the vehicle indicated by the line 2—2 in FIG. 1.

FIG. 3 is an enlarged sectional view on the line 3—3 of FIG. 2.

FIG. 4 is an enlarged fragmentary view on the line 4—4 of FIG. 2.

As an example of one embodiment of this invention there is shown in FIG. 1 a conventional bicycle converted to three-wheel arrangement having the usual front wheel 10, front fork 11 and handle bars 12 mounted to swivel at 13 on the front of the regular bicycle frame 14. The usual seat 15 is supported on the seat post 16 of the frame 14 above the conventional pedals 17 and pedal sprocket 18 with the regular upper 19 and lower 20 rear wheel forks converging rearwardly at the usual rear wheel axis 21 of the frame 14.

The conversion axle of this invention for changing the conventional two-wheel bicycle to a three-wheeled vehicle comprises an axle housing structure 22 comprising a pair of coaxially aligned tubular members 23 and 24 arranged around the common wheel axis 25, FIGS. 2 and 3. The outer end of the tubular member 23 has a suitable plug 26 fixed therein having a threaded bore 27 adapted to receive one threaded end 28 of the axle 29 of a standard front bicycle wheel 30. The outer end 31 of the axle 29 is clamped by the usual nut 32 to the lower junction point 33 of the support forks 34. The inner junction point 35 of the forks 34 is secured by a suitable bolt 36 to a lug fixed adjacent to the outer end 37 of the tubular member 23 to provide outboard support for the axle 29 and wheel 30.

The inner end 38 of the tubular member 23 is held rigidly in axially spaced and aligned relationship with the inner end 39 of the tubular member 24 by the yoke 40 which is rigidly secured at 40a to the tubular member 23 and at 40b to the tubular member 24 so as to provide a bridge piece between the inner ends 38 and 39 of the tubular members 23 and 24. Suitable frame support lugs 41 and 42, FIGS. 3 and 4, are rigidly fixed adjacent the inner ends 38 and 39 of the tubular members 23 and 24 and are secured by suitable bolts 43 to the junction point 44 of the upper and lower rear wheel forks 19 and 20 in place of the regular rear coaster-brake wheel of the bicycle. A further rigidifying tie bar 45 may be provided between the lug 41 and the inner end 39 of the tubular member 24 if desired.

Adjacent the inner end 39 of the tubular member 24 is mounted a suitable anti-friction bearing 46 while adjacent the outer end 47 thereof is mounted a suitable anti-friction bearing 48. An axle shaft 49 is journaled against axial movement on the bearings 46 and 48 and has fixed to its inner end 50 a drive sprocket 51 which is connected to be driven by the usual bicycle chain 52 operating over pedal sprocket 18.

The outer end of the axle shaft 49 has formed thereon a drive flange 53 which is adapted to be fixed to the periphery of the sprocket 54 of a standard coaster-brake 55 by suitable bolts 56 to provide means for the supporting and driving the standard bicycle rear wheel 57. A pair of support forks 58 have their outer junction point 58a secured to the outer threaded end 59 of the coaster-brake axle 60, by the usual nut 61 while the inner junction point 62 of the support forks 58 is bolted to the lug 63, fixed adjacent the outer end of the tubular member 24, by a suitable bolt 64. Suitable tie rods 65 and 66 are rigidly fixed between the upper ends of the support forks 34 and 58, the tie rod 65 being secured by suitable clamps 67 to the upper end of the bicycle fork 19.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appended claims are intended to be included herein.

Having thus fully set forth and described this invention what is claimed and desired to be obtained by United States Letters Patent is:

1. A conversion axle for a three-wheel bicycle comprising in combination:

(a) a pair of coaxially aligned tubular members,
(b) a yoke rigidly interconnected between said tubular members to hold the inner ends of said tubular members in axially spaced position,
(c) means on the outer end of one of said tubular members arranged to be fixed to one end of the bearing axle of a standard bicycle front wheel to support said standard front wheel in operative position,
(d) an axle shaft journaled in the other of said tubular members having an inner end projecting into said space between the inner ends of said tubular members,
(e) a drive sprocket fixed to said inner end of said axle shaft adapted to be driven by the regular bicycle chain of the bicycle to be converted,
(f) a driving flange fixed on the outer end of said axle shaft arranged to be fixed to the peripheral teeth of the drive sprocket of a standard coaster-brake bicycle rear wheel from the bicycle to be converted to support said coaster-brake rear wheel in operative position, (g) and means for securing said conversion axle to the bicycle frame slotted rear forks used to support the standard rear coaster-brake wheel.

2. In a conversion axle for a three-wheel bicycle as set forth in claim 1;

(h) and a pair of support forks extending radially outwardly of each rear mounted wheel interconnected between the outer ends of said tubular members and outer ends of the bearing axles of said rear mounted wheels.

References Cited by the Examiner

UNITED STATES PATENTS

| 636,570 | 11/1899 | Shugers | 280—7.1 |
| 2,995,378 | 8/1961 | Whetstone | 280—7.15 |

FOREIGN PATENTS

| 797,867 | 7/1958 | Great Britain. |

BENJAMIN HERSH, *Primary Examiner.*

MILTON L. SMITH, *Examiner.*